United States Patent
Chen

(10) Patent No.: US 10,963,099 B2
(45) Date of Patent: Mar. 30, 2021

(54) NOISE REDUCTION METHOD, TOUCH DISPLAY APPARATUS, AND COMPUTER-READABLE STORAGE MEDIUM

(71) Applicant: SHENZHEN GOODIX TECHNOLOGY CO., LTD., Guangdong (CN)

(72) Inventor: Xi Chen, Shenzhen (CN)

(73) Assignee: Shenzhen Goodix Technology Co., LTD, Shenzhen (CN)

( * ) Notice: Subject to any disclaimer, the term of this patent is extended or adjusted under 35 U.S.C. 154(b) by 0 days.

(21) Appl. No.: 16/683,087

(22) Filed: Nov. 13, 2019

(65) Prior Publication Data

US 2020/0133429 A1 Apr. 30, 2020

Related U.S. Application Data

(63) Continuation of application No. PCT/CN2018/112952, filed on Oct. 31, 2018.

(51) Int. Cl.
G06F 3/041 (2006.01)
G06F 3/044 (2006.01)

(52) U.S. Cl.
CPC .......... *G06F 3/0418* (2013.01); *G06F 3/0446* (2019.05)

(58) Field of Classification Search
CPC combination set(s) only.
See application file for complete search history.

(56) References Cited

U.S. PATENT DOCUMENTS

| 2011/0242045 A1 | 10/2011 | Park et al. |
| 2013/0033451 A1 | 2/2013 | Olson |
| 2013/0265242 A1 | 10/2013 | Richards et al. |

(Continued)

FOREIGN PATENT DOCUMENTS

| CN | 102999236 A | 3/2013 |
| CN | 103955898 A | 7/2014 |
| WO | 2018176197 A1 | 10/2018 |

OTHER PUBLICATIONS

Extended European Search Report dated Jul. 24, 2020, Patent Application No. 18917574.8, 12 pages.

(Continued)

*Primary Examiner* — Deeprose Subedi
(74) *Attorney, Agent, or Firm* — Davis Wright Tremaine LLP

(57) ABSTRACT

Embodiments of the present disclosure provide a noise reduction method. The noise reduction method is applied to the touch display apparatus on which several touch detection nodes are disposed, and the noise reduction method includes: obtaining noise data of each touch detection node (101); obtaining characteristic values based on the noise data (102); performing fitting processing on noise data of a target node and the characteristic values, to obtain a fitting function in which the characteristic values are used as an independent variable and the noise data of the target node is used as a dependent variable (103), where a target node is a touch detection node to be noise reduced; substituting the characteristic values into the fitting function, to obtain fitting data corresponding to the characteristic values (104); and using differences between the fitting data and the noise data of the target node as noise reduced data (105).

20 Claims, 4 Drawing Sheets

(56) References Cited

U.S. PATENT DOCUMENTS

2015/0103046 A1\* 4/2015 Liu ..................... G06F 3/0412
345/174
2015/0268792 A1\* 9/2015 Hamaguchi ........... G06F 3/0446
345/174

OTHER PUBLICATIONS

International Search Report and Written Opinion dated Jul. 31, 2019, International Patent Application No. PCT/CN2018/112952, filed Oct. 31, 2018, 9 pages.

\* cited by examiner

NOISE REDUCTION METHOD, TOUCH DISPLAY APPARATUS, AND COMPUTER-READABLE STORAGE MEDIUM

CROSS-REFERENCE TO RELATED APPLICATION

This application is a continuation of International Application No. PCT/CN2018/112952, filed on Oct. 31, 2018, the disclosure of which is hereby incorporated by reference in its entirety.

TECHNICAL FIELD

The present disclosure relates to the field of touch display technologies, and in particular, to a noise reduction method, a touch display apparatus, and a computer-readable storage medium.

BACKGROUND

With the development of sciences and technologies, novel structures of touch display screens continuously appear on the market. Flexible screens, represented by Y-OCTA, occupy an important position thereof. To improve an effect in use in actual application, it is usually necessary to remove noise interference caused by an LCD.

SUMMARY

An objective of embodiments of the present disclosure is to provide a noise reduction method, a touch display apparatus, and a computer-readable storage medium, so that hardware costs are reduced, and an impact of a limit of a fixed sampling frequency can be avoided. In addition, noise interference of a non-direct current component can be filtered out.

An embodiment of the present disclosure provides a noise reduction method, applied to a touch display apparatus on which several touch detection nodes are disposed, and the noise reduction method includes: obtaining noise data of each touch detection node; obtaining characteristic values based on the noise data; performing fitting processing on noise data of a target node and the characteristic values, to obtain a fitting function in which the characteristic values are used as an independent variable and the noise data of the target node is used as a dependent variable, where the target node is a touch detection node to be noise reduced; substituting the characteristic values into the fitting function, to obtain fitting data corresponding to the characteristic values; and using differences between the fitting data and the noise data of the target node as noise reduced data.

An embodiment of the present disclosure further provides a touch display apparatus on which several touch detection nodes are disposed, and the touch display apparatus includes: a noise data obtaining module, configured to obtain noise data of each touch detection node; a characteristic value obtaining module, configured to obtain characteristic values based on the noise data; a fitting processing module, configured to perform fitting processing on noise data of a target node and the characteristic values, to obtain a fitting function in which the characteristic values are used as an independent variable and the noise data of the target node is used as a dependent variable, where the target node is a touch detection node to be noise reduced; a fitting data obtaining module, configured to substitute the characteristic values into the fitting function, to obtain fitting data corresponding to the characteristic values; and a noise reducing module, configured to use differences between the fitting data and the noise data of the target node as noise reduced data.

An embodiment of the present disclosure further provides a touch display apparatus, including: at least one processor; and a memory communicably connected with the at least one processor. The memory stores instructions executable by the at least one processor. The instructions, when executed by the at least one processor, cause the at least one processor to perform the foregoing noise reduction method.

An embodiment of the present disclosure further provides a computer-readable storage medium, storing a computer program. The computer program, when executed by a processor, implements the foregoing noise reduction method.

Compared with the existing technologies, in the embodiments of the present disclosure, a fitting function is obtained based on characteristic values of noise data of touch detection nodes and noise data of a target node to be noise reduced, fitting data corresponding to the characteristic values are obtained by substituting the characteristic values into the fitting function, and differences between the fitting data and the noise data of the target node are used as noise reduced data. In a software fitting manner, noise data that is of a direct current component and a non-direct current component and that is caused by a display screen can be directly filtered out. Therefore, a signal-to-noise ratio is increased, hardware costs required in synchronization processing are reduced, and an impact of a limit of a fixed sampling frequency can be avoided. The noise reduced data provides a strong guarantee for obtaining an accurate and stable touch detection result in subsequent processing.

In an example, obtaining noise data of each touch detection node specifically includes: performing sampling on each touch detection node, to obtain sampling data of each touch detection node; separately calculating a difference between the sampling data of each touch detection node and a datum reference value of each touch detection node; and using the difference of each touch detection node as the noise data of each touch detection node. In a touch-free and interference-free state, a touch detection apparatus itself generates static background detection data. The static background detection data is represented by using a datum reference value. Therefore, the using the difference between the sampling data of each touch detection node and the datum reference value of each touch detection node as the noise data of each touch detection node facilitates obtaining accurate noise data, thereby improving accuracy of noise reduction.

In an example, before obtaining characteristic values based on the noise data, the noise reduction method further includes: when there is a touch detection node meeting a preset condition, removing, from the noise data of each touch detection node, the noise data of the touch detection node meeting the preset condition, where the preset condition is that noise data of a touch detection node is greater than a preset threshold. That the noise data of a touch detection node is greater than a preset threshold means that a finger touches the touch detection node. Data obtained through sampling on the touch detection node is removed, to eliminate an impact caused by a touch of the finger during noise reducing. This facilitates improving accuracy of fitting processing, thereby further ensuring accuracy of noise reduction.

In an example, separately performing statistical processing on noise data that is obtained by performing multiple sampling on each selected touch detection node specifically includes: separately performing statistical processing, based on the noise data that is obtained by performing multiple sampling on each selected touch detection node, to obtain a maximum value, a minimum value, or an average value of the noise data of each selected touch detection node; and obtaining the characteristic values based on a statistic result specifically includes: using the maximum value, the minimum value, or the average value as the characteristic value. A manner of obtaining a characteristic value is provided.

In an example, separately performing statistical processing on noise data that is obtained by performing multiple sampling on each selected touch detection node specifically includes: separately performing statistical processing, based on the noise data that is obtained by performing multiple sampling on each selected touch detection node, to obtain a mode interval of the noise data of each selected touch detection node; and obtaining the characteristic values based on a statistic result specifically includes: obtaining the characteristic values based on the statistic mode interval. Another manner of obtaining a characteristic value is provided, so that implementations of the present disclosure can be flexibly implemented.

In an example, a target node specifically refers to touch detection nodes to be noise reduced that have a same vertical axis coordinate and different horizontal axis coordinates, and the fitting function specifically is a fitting function on a horizontal axis. In this case, obtaining characteristic values based on the noise data specifically includes: extracting noise data of touch detection nodes having a same vertical axis coordinate and different horizontal axis coordinates, where the vertical axis coordinate of extracted touch detection nodes is different from that of the target node; and using the extracted noise data of the touch detection nodes as the characteristic values. A manner of performing fitting processing in a unit of a horizontal axis is provided.

In an example, a target node specifically refers to touch detection nodes to be noise reduced that have a same horizontal axis coordinate and different vertical axis coordinates, and the fitting function specifically is a fitting function on a vertical axis. In this case, obtaining characteristic values based on the noise data specifically includes: extracting noise data of touch detection nodes having a same horizontal axis coordinate and different vertical axis coordinates, where the horizontal axis coordinate of extracted touch detection nodes is different from that of the target node; and using the extracted noise data of the touch detection nodes as the characteristic values. Another manner of performing fitting processing in a unit of a vertical axis is provided, so that the implementations of the present disclosure can be flexibly implemented.

BRIEF DESCRIPTION OF THE DRAWINGS

One or more embodiments are described as examples by using the accompanying drawings corresponding to the embodiments. These exemplary descriptions are not intended to limit the embodiments. Elements having a same reference numeral mark in the accompanying drawings are indicated as similar elements. Unless otherwise stated, a drawing in the accompanying drawings does not constitute a proportion limit.

DETAILED DESCRIPTION

The inventor finds that there are the following problems: in the existing technologies, noise caused by an LCD is avoided mainly through synchronous sampling. However, synchronization processing causes the following side effects. (1) A requirement on real-time performance of hardware is very high, and hardware costs need to be increased. When the synchronization processing is not completed, a touch screen is also subject to relatively strong interference and cannot be used. (2) Due to a requirement of a synchronization signal, the touch screen needs to use a fixed frequency to perform data collection, and cannot switch a sampling frequency; this greatly reduces resistibility of the touch screen against other external interference. (3) In an existing environment, most LCD noise interference is of a direct current component; and in the existing technologies, direct current noise on a screen is removed to achieve the purpose of noise reduction. As a result, noise reduction cannot be performed when the screen is subject to LCD noise interference of a non-direct current component.

To make objectives, technical solutions, and advantages of the present disclosure clearer, the following further describes embodiments of the present disclosure in detail with reference to the accompanying drawings and embodiments. It should be understood that the specific embodiments described herein are merely used to explain the present disclosure; however, these embodiments are not intended to limit the present disclosure.

A first embodiment of the present disclosure relates to a noise reduction method, including: obtaining noise data of each touch detection node; obtaining characteristic values based on the noise data; performing fitting processing on noise data of a target node and the characteristic values, to obtain a fitting function in which the characteristic values are used as an independent variable and the noise data of the target node is used as a dependent variable, where the target node is a touch detection node to be noise reduced; substituting the characteristic values into the fitting function, to obtain fitting data corresponding to the characteristic values; and using differences between the fitting data and the noise data of the target node as noise reduced data. Therefore, hardware costs are reduced, and an impact of a limit of a fixed sampling frequency can be avoided. In addition, noise interference of a non-direct current component can be filtered out.

Figure 1:
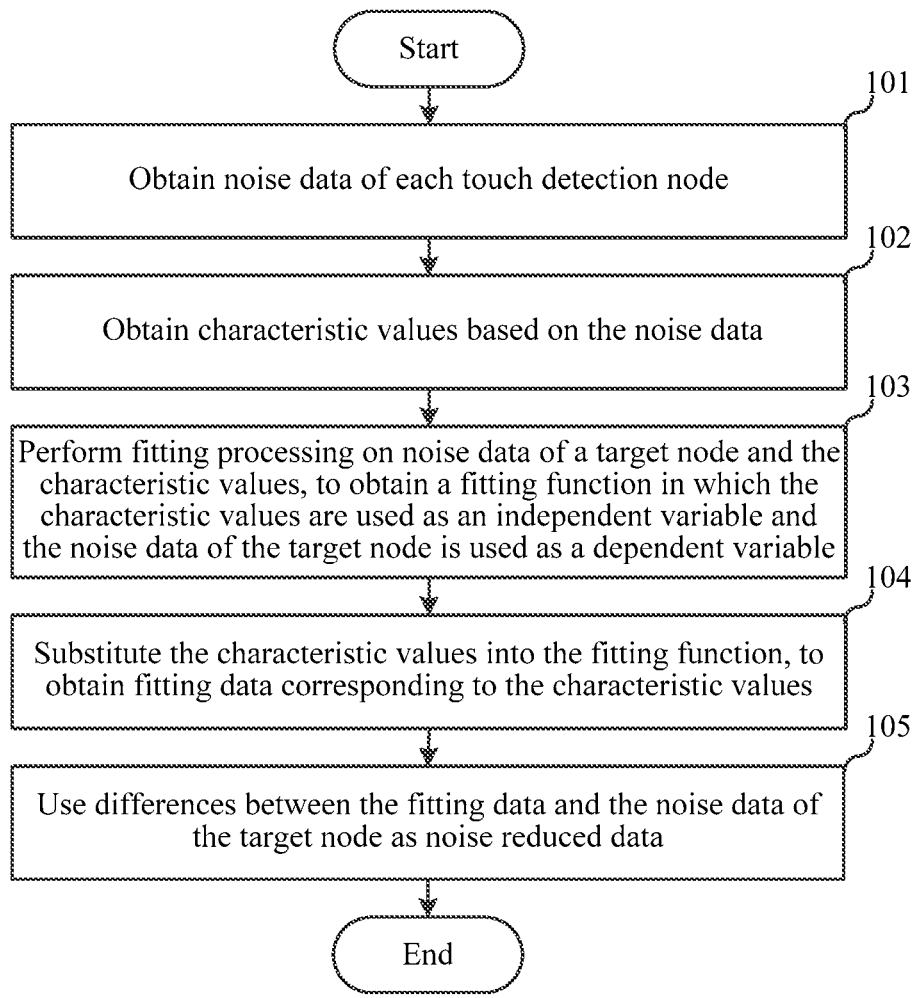
FIG. 1 is a flowchart of a noise reduction method according to a first embodiment of the present disclosure.

The noise reduction method in this embodiment is applied to a touch display apparatus. The touch display apparatus may be an apparatus whose touch control layer is integrated in a display panel. For example, the touch display apparatus may be a Y-OCTA screen. In actual application, the noise reduction method in this embodiment may not only be applied to the Y-OCTA screen. In all cases in which LCD noise has a great impact and a direct current component model cannot be used for fitting, the noise reduction method may be used. In this embodiment, an example in which the noise reduction method is applied to the Y-OCTA screen is used; however, in actual application, the present disclosure is not limited to the Y-OCTA screen. Several touch detection nodes are disposed on the Y-OCTA screen. The touch detection nodes are a plurality of projected capacitive nodes that are vertically and horizontally distributed on a surface of the Y-OCTA screen to form a matrix shape, that is, the touch detection nodes may be arranged in a matrix shape. Different touch detection nodes are subjected to different quantities of interference. Magnitudes of noise occurring at different moments are random, and a magnitude of noise interferes with processing on detected finger touch information. Therefore, noise on the Y-OCTA screen needs to be filtered out. A specific process of the noise reduction method in this embodiment is shown in FIG. 1 and includes the following steps.

Step 101: Obtain noise data of each touch detection node.

Specifically, each touch detection node on the Y-OCTA screen may be sampled in a scanning manner. In each detection sampling period, required sampling data of each touch detection node may be obtained through grouping or be obtained one by one. The sampling data may be used as LCD noise data, as shown in Table 1.

TABLE 1

| | | | | | | | |
|---|---|---|---|---|---|---|---|
| −233 | −181 | −22 | 0 | 0 | 5 | 0 | −330 |
| −264 | −178 | −22 | 99 | 111 | 4 | 38 | −364 |
| −262 | −164 | −27 | 205 | 209 | 3 | 69 | −395 |
| −221 | −131 | −27 | 327 | 322 | 46 | 135 | −362 |
| −255 | −148 | −41 | 358 | 358 | 18 | 129 | −417 |
| −180 | −140 | −32 | 446 | 402 | 36 | 168 | −368 |
| −173 | −105 | 1 | 493 | 449 | 15 | 180 | −373 |
| −181 | −91 | −1 | 526 | 469 | −17 | 168 | −376 |
| −297 | −125 | 0 | 411 | 396 | −8 | 125 | −427 |

Step 102: Obtain characteristic values based on the noise data.

Specifically, in this embodiment, three solutions in which the characteristic values may be obtained are mainly listed in the following.

Solution 1: The target node to be noise reduced refers to touch detection nodes having a same vertical axis coordinate and different horizontal axis coordinates, that is, touch detection nodes located in a same row. Obtaining the characteristic values based on the noise data may be implemented by: extracting noise data of touch detection nodes having a same vertical axis coordinate and different horizontal axis coordinates, where the vertical axis coordinate of extracted touch detection nodes is different from that of the target node; and using the extracted noise data of the touch detection nodes as the characteristic values. In an example, the target node to be noise reduced may be nodes to which noise data in a last row in Table 1 belongs. The extracted noise data that can be used as the characteristic values may be: randomly-extracted noise data in a sixth row that is different from the last row.

Solution 2: The target node to be noise reduced refers to touch detection nodes having a same horizontal axis coordinate and different vertical axis coordinates, that is, touch detection nodes located in a same column. Obtaining the characteristic values based on the noise data may be implemented by: extracting noise data of touch detection nodes having a same horizontal axis coordinate and different vertical axis coordinates, where the horizontal axis coordinate of extracted touch detection nodes is different from that of the target node; and using the extracted noise data of the touch detection nodes as the characteristic values. In an example, the target node to be noise reduced may be nodes to which noise data in a last column in Table 1 belongs. The extracted noise data that can be used as the characteristic values may be: randomly-extracted noise data in a sixth column that is different from the last column.

Solution 3: The target node to be noise reduced is a certain touch detection node. Obtaining the characteristic values based on the noise data may be implemented by: extracting noise data of first-type touch detection nodes having a same vertical axis coordinate and different horizontal axis coordinates as first-type characteristic values, where the vertical axis coordinate of the first-type touch detection nodes is different from that of the target node; and extracting noise data of second-type touch detection nodes having a same horizontal axis coordinate and different vertical axis coordinates as second-type characteristic values, where the horizontal axis coordinate of the second-type touch detection nodes is different from that of the target node. For example, if the target node to be noise reduced is a node located in a third row and a third column in Table 1, the first-type characteristic values may be extracted from any row other than the third row, and the second-type characteristic values may be extracted from any column other than the third column.

That is, noise data in any row or any column in the foregoing Table 1 may be used as the characteristic values. It should be noted that merely three solutions in which the characteristic values may be obtained are listed in this embodiment; however, in actual application, the present disclosure is not limited to the three solutions.

Step 103: Perform fitting processing on noise data of a target node and the characteristic values, to obtain a fitting function in which the characteristic values are used as an independent variable and the noise data of the target node is used as a dependent variable.

Specifically, the target node is a touch detection node to be noise reduced. This embodiment specifically provides the following four solutions for obtaining a fitting function.

Solution 1: A horizontal axis is used as a unit to perform fitting. The target node refers to touch detection nodes to be noise reduced that have a same vertical axis coordinate and different horizontal axis coordinates, and an obtained fitting function specifically is a fitting function on the horizontal axis. In an example, the process of a fitting processing may be as follows.

A. Data in the sixth row in Table 1 is extracted and is directly used as the characteristic values, and the characteristic values are shown in the following Table 2.

TABLE 2

| | | | | | | | |
|---|---|---|---|---|---|---|---|
| −180 | −140 | −32 | 446 | 402 | 36 | 168 | −368 |

B. Data in the last row in Table 1 is extracted as noise data to be noise reduced, and the noise data to be noise reduced is shown in the following Table 3.

TABLE 3

| | | | | | | | |
|---|---|---|---|---|---|---|---|
| −297 | −125 | 0 | 411 | 396 | −8 | 125 | −427 |

C. Fitting is performed by using the characteristic values in Table 2 as an independent variable and using the noise data to be noise reduced in Table 3 as a dependent variable. Specifically, the fitting may be performed by using a linear function model or a non-linear function model, to obtain a coefficient of the fitting function, thereby determining the fitting function on the horizontal axis.

Solution 2: A vertical axis is used as a unit to perform fitting. A method for performing fitting in a unit of the vertical axis is similar to a method for performing fitting in a unit of the horizontal axis. A difference lies in that when fitting is performed by using the vertical axis as a unit, data on the vertical axis are extracted as the characteristic values, and the fitting is performed by using the characteristic values on the vertical axis as an independent variable, and using noise data to be noise reduced on the vertical axis as a dependent variable, to obtain a fitting function on the vertical axis.

Solution 3: Two-dimensional curved surface fitting is performed. The target node is a certain node to be noise reduced. Fitting processing is performed on the first-type characteristic values and noise data of first reference target nodes, to obtain a first fitting subfunction. The first reference target nodes are touch detection nodes located in the same row as the target node. Fitting processing is performed on the second-type characteristic values and noise data of second reference target nodes, to obtain a second fitting subfunction. The second reference target nodes are touch detection nodes located in the same column as the target node. The first fitting subfunction and the second fitting subfunction are superimposed to obtain the fitting function.

For example, if the target node to be noise reduced is a node located in the third row and the third column in Table 1, the extracted first-type characteristic values are noise data in a fifth row, and the extracted second-type characteristic values are noise data in a fifth column. Fitting is performed on noise data in the third row and the noise data in the fifth row to obtain the first fitting subfunction f1(x), and fitting is performed on noise data in the third column and the noise data in the fifth column to obtain the second fitting subfunction f2(x). Then, two fitting effects are superimposed to obtain a fitting function y=f2(f1(x)) of the touch detection nodes to be noise reduced.

Solution 4: Fitting is performed on a part of data. A difference between a fitting scheme in Solution 4 and that in Solution 1 lies in that the characteristic values and the noise data to be noise reduced that are selected in Solution 1 are both data on a certain horizontal axis; and in Solution 4, a part of data in Table 1 may be randomly selected, and is unnecessarily data on a same horizontal axis.

It should be noted that in this embodiment, the foregoing four solutions for fitting processing are listed merely for convenience of description; however, in actual application, solutions for fitting processing are not limited to the four solutions.

Step 104: Substitute the characteristic values into the fitting function, to obtain fitting data corresponding to the characteristic values.

Specifically, Solution 1 in Step 103 is used as an example. The characteristic values in Table 2 are substituted into the obtained fitting function on the horizontal axis, to obtain the fitting data corresponding to the characteristic values, as shown in the following Table 4.

TABLE 4

| -234 | -192 | -78 | 425 | 378 | -7 | 132 | -431 |

Processing manners about this step in foregoing Solution 2, Solution 3, and Solution 4 are approximately the same as a processing manner in Solution 1. To avoid repetition, details are not described herein again.

Step 105: Use differences between the fitting data and the noise data of the target node as noise reduced data.

Specifically, Solution 1 is used as an example. Differences between the fitting data and the noise data of the target node are calculated, that is, data in Table 3 is subtracted from data in Table 4, to obtain the noise reduced data as shown in Table 5. The noise reduced data may be used for subsequent coordinate calculation processing. It means that for detection data that is used by the Y-OCTA screen in subsequent processing and control, noise interference is excluded to a great extent. Therefore, the Y-OCTA screen can operate reliably and stably in an interference environment.

TABLE 5

| 63 | -67 | -78 | 14 | -18 | 1 | 7 | -4 |

For convenience of description, in this embodiment, a process of performing fitting by using the vertical axis as a unit is provided, where the determined characteristic values, the noise data to be filtered out, the fitted fitting data, and the noise reduced data are shown in a form of Table 6. The specific process is similar to a process of performing fitting by using the horizontal axis as a unit. To avoid repetition, details are not described herein again.

TABLE 6

| A: Characteristic value | B: Noise data to be filtered out | C: Fitting data | D: Noise reduced data |
| --- | --- | --- | --- |
| 154 | -233 | -241 | -8 |
| 135 | -264 | -246 | 18 |
| 166 | -262 | -238 | 24 |
| 196 | -221 | -231 | -10 |
| 215 | -255 | -226 | 29 |
| 221 | -180 | -225 | -45 |
| 223 | -173 | -224 | -51 |
| 228 | -181 | -223 | -42 |
| 255 | -297 | -216 | 81 |

Compared with the existing technology, in this embodiment, a problem that when a touch display screen is subject to LCD noise of a non-direct current component, noise reduction cannot be performed and a finger signal cannot be accurately identified is overcome in a software fitting manner. In this embodiment, LCD noise of a non-direct current component can be filtered out relatively effectively, and a normal touch control effect is maintained when subject to relatively large LCD noise. In addition, a signal-to-noise ratio is increased, hardware costs required in synchronization processing are reduced, and an impact of a limit of a fixed sampling frequency can be avoided.

A second embodiment of the present disclosure relates to a noise reduction method. The second embodiment and the first embodiment are approximately the same, and a difference lies in that methods for obtaining characteristic values are different. In the first embodiment, once sampling is performed on each touch detection node, and extracted noise data of the touch detection nodes on a horizontal axis or a vertical axis are used as characteristic values. However, in this embodiment, multiple sampling is performed on touch detection nodes, statistical processing is performed on noise data obtained through multiple sampling, and characteristic values are obtained based on a statistic result.

Figure 2:
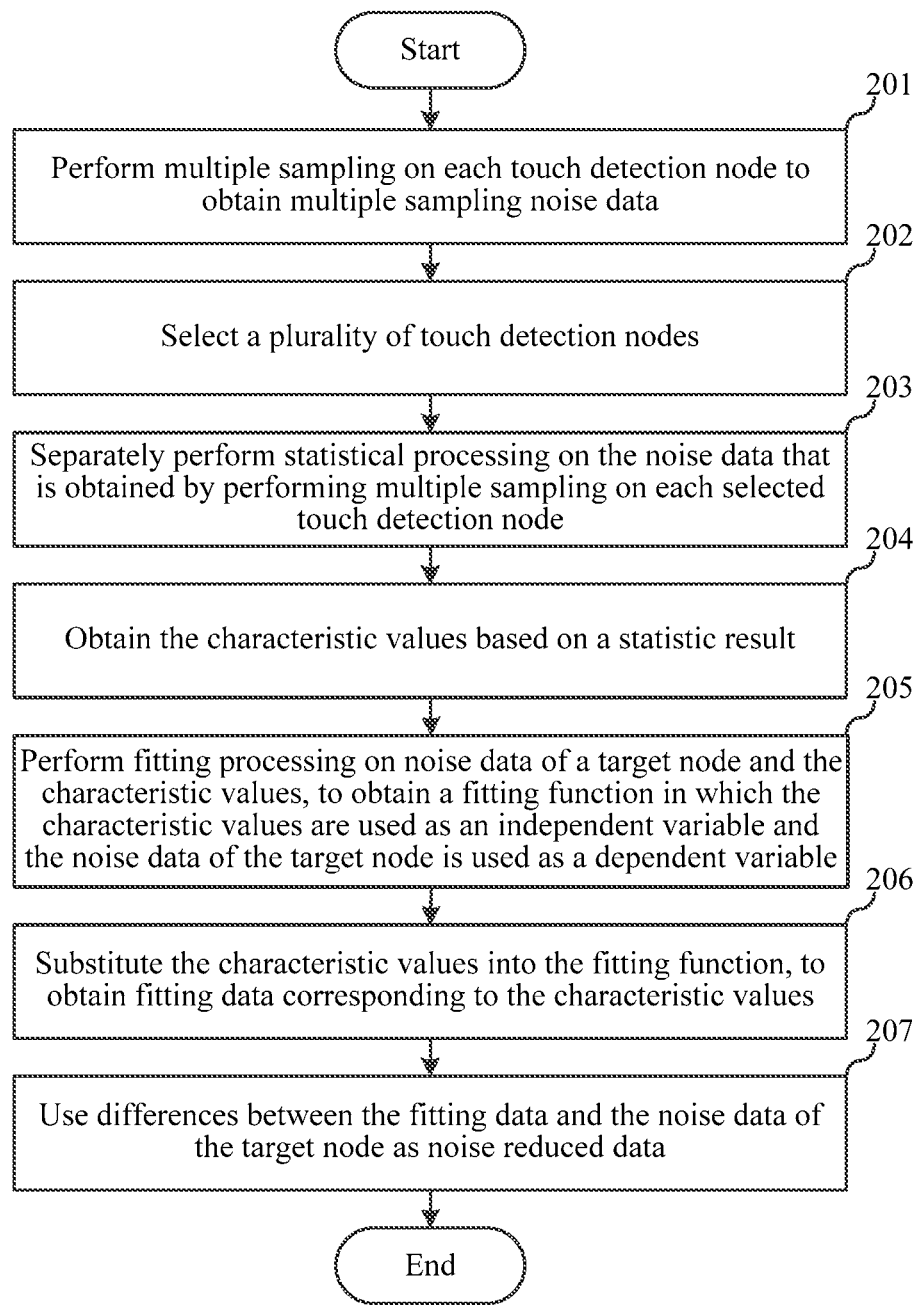
FIG. 2 is a flowchart of a noise reduction method according to a second embodiment of the present disclosure.

A specific process of the noise reduction method in this embodiment is shown in FIG. 2 and includes the following steps.

Step 201: Perform multiple sampling on each touch detection node to obtain multiple sampling noise data.

For example, in this embodiment, each touch detection node may be sampled for ten times, and each touch detection node records noise data obtained through the ten times of sampling.

Step 202: Select a plurality of touch detection nodes.

Specifically, several touch detection nodes may be randomly selected from touch detection nodes on a Y-OCTA screen. Preferably, a plurality of selected touch detection nodes may have a same vertical coordinate and different horizontal coordinates, or may have different vertical coordinates and a same horizontal coordinate. For example, touch detection nodes in a certain row or in a certain column are selected according to a particular rule. For convenience of description, in this embodiment, seven touch detection nodes are selected, and noise data of the seven selected touch detection nodes is the noise data obtained through the ten times of sampling performed on each touch detection node, as shown in the following Table 7.

TABLE 7

| $i^{th}$ time of sampling | Node 1 | Node 2 | Node 3 | Node 4 | Node 5 | Node 6 | Node 7 |
|---|---|---|---|---|---|---|---|
| 0 | −66 | −74 | −66 | −54 | −52 | −46 | −56 |
| 1 | −63 | −68 | −60 | −47 | −44 | −38 | −51 |
| 2 | −60 | −67 | −63 | −39 | −38 | −29 | −42 |
| 3 | −46 | −52 | −46 | −32 | −31 | −16 | −23 |
| 4 | −52 | −58 | −52 | −35 | −34 | −23 | −32 |
| 5 | −70 | −83 | −78 | −61 | −62 | −51 | −59 |
| 6 | −52 | −52 | −39 | −23 | −24 | −7 | −11 |
| 7 | −27 | −23 | −10 | −9 | −12 | 9 | 8 |
| 8 | −9 | −18 | −11 | −6 | −10 | 0 | −1 |
| 9 | −8 | −24 | −17 | −5 | −7 | −4 | −9 |

Step 203: Separately perform statistical processing on the noise data that is obtained by performing multiple sampling on each selected touch detection node.

Specifically, a maximum value, a minimum value, or an average value of the noise data of each selected touch detection node may be obtained by separately performing statistical processing based on the noise data that is obtained by performing multiple sampling on each selected touch detection node. For example, a maximum value, a minimum value, or an average value of noise data that is obtained by performing the ten times of sampling on the seven nodes selected in step 202 may be separately calculated. A statistic result obtained through calculation based on data in Table 7 is shown in Table 8. In actual application, a mode interval of each node, that is, a set of several pieces of data occurring for a relatively large quantity of times in multiple sampling data of each node may be further obtained through statistical processing.

TABLE 8

| Statistic result | Node 1 | Node 2 | Node 3 | Node 4 | Node 5 | Node 6 | Node 7 |
|---|---|---|---|---|---|---|---|
| Maximum value | −8 | −18 | −10 | −5 | −7 | 9 | 8 |
| Minimum value | −70 | −83 | −78 | −61 | −62 | −51 | −59 |
| Average value | −45.3 | −51.9 | −44.2 | −31.1 | −31.4 | −20.5 | −27.6 |

Step 204: Obtain the characteristic values based on a statistic result.

Specifically, if the statistic result is a maximum value, a minimum value, or an average value, the maximum value, the minimum value, or the average value may be used as the characteristic value. If the mode interval of each node is obtained, the characteristic value may be obtained according to the mode interval. For example, if the mode interval is a set including three pieces of data, a maximum or a minimum of the three pieces of data may be used as the characteristic value, or an average value of the three pieces of data is calculated and is used as the characteristic value.

Step 205: Perform fitting processing on noise data of a target node and the characteristic values, to obtain a fitting function in which the characteristic values are used as an independent variable and the noise data of the target node is used as a dependent variable.

Step 206: Substitute the characteristic values into the fitting function, to obtain fitting data corresponding to the characteristic values.

Step 207: Use differences between the fitting data and the noise data of the target node as noise reduced data.

Step 205 to Step 207 are approximately the same as Step 103 to Step 105 in the first embodiment. To avoid repetition, details are not described herein again.

Compared with the existing technologies, in this embodiment, the characteristic value is obtained through statistical processing based on the noise data. However, the statistical method includes, but is not limited to, the following method: calculating a maximum value, a minimum value, an average value, and a mode interval of noise data of touch detection nodes that are sampled for a plurality of times. A feature model is established for noise based on the statistical data. The feature model uses the characteristic values obtained through statistical processing as a basis for the fitting processing. This facilitates performing appropriate fitting processing, thereby improving accuracy of noise reduction.

A third embodiment of the present disclosure relates to a noise reduction method. The third embodiment is further improved based on the first embodiment, and a main improvement lies in that: in this embodiment, when fitting is performed, a touch detection node with finger touch are removed, so that a fitting result is more accurate.

Figure 3:
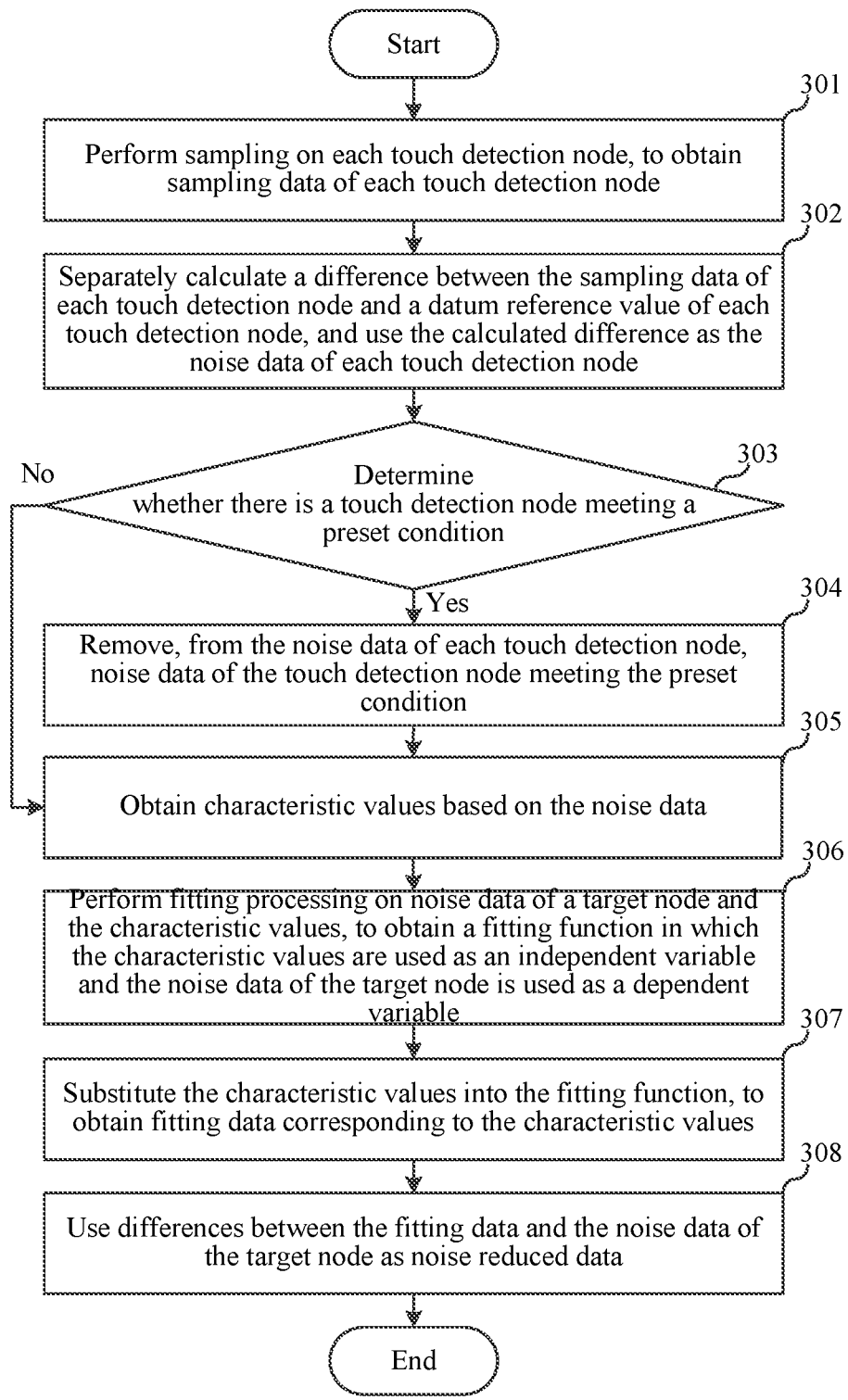
FIG. 3 is a flowchart of a noise reduction method according to a third embodiment of the present disclosure.

A specific process of the noise reduction method in this embodiment is shown in FIG. 3 and includes the following steps.

Step 301: Perform sampling on each touch detection node, to obtain sampling data of each touch detection node.

Step 302: Separately calculate a difference between the sampling data of each touch detection node and a datum reference value of each touch detection node, and use the calculated difference as the noise data of each touch detection node.

Specifically, the calculated difference is a result of revising the sampling data relative to the datum reference value and is used as the noise data for a next step of processing. The datum reference value used in actual application is static background detection data that is detected in a touch-free and interference-free state by a touch display apparatus. The static background detection data is represented by the datum reference value. The datum reference value is deducted from the sampling data to obtain accurate noise data. The datum reference value may be maintained in a code running process.

Step 303: Determine whether there is a touch detection node meeting a preset condition. If yes, perform Step 304; otherwise, perform Step 305.

Specifically, in addition to including a systematic noise component, detection data may further include a local touch information component. However, final noise reduction processing may be affected when data including the touch information component is used to perform the next step of fitting processing. To perform noise reduction effectively, the data including the touch information component needs to be excluded from data used in the following fitting processing. More specifically, statistical calculation processing needs to be performed, and in principle, only valid noise data is selected. The preset condition is that noise data of a touch detection node is greater than a preset threshold. The preset threshold may be set by a person skilled in the art based on requirements in actual application. For example, touch detection nodes meeting the preset condition may be shown in the following Table 9. In Table 9, to highlight the touch detection nodes meeting the preset condition, data of other nodes is not indicated. The touch detection nodes to which indicated data belongs are the nodes on which finger touch is detected.

TABLE 9

| 20 | 200 | 170 | 10 |
|----|-----|-----|----|
| 60 | 365 | 256 | 30 |
|    | 50  | 30  |    |

Step 304: Remove, from the noise data of each touch detection node, noise data of the touch detection node meeting the preset condition.

Specifically, removing the noise data of the touch detection node meeting the preset condition may be understood as changing a size of the noise data of the touch detection node meeting the preset condition to 0, as shown in the following Table 10.

TABLE 10

| −233 | 0    | −22 | 0   | 0   | 5   | 0   | −330 |
|------|------|-----|-----|-----|-----|-----|------|
| −264 | −178 | −22 | 99  | 111 | 4   | 38  | −364 |
| −262 | −164 | 0   | 0   | 0   | 0   | 69  | −395 |
| −221 | −131 | 0   | 0   | 0   | 0   | 135 | −362 |
| −255 | −148 | −41 | 0   | 0   | 18  | 129 | −417 |
| −180 | −140 | −32 | 446 | 402 | 36  | 168 | −368 |
| −173 | −105 | 1   | 493 | 449 | 15  | 180 | −373 |
| −181 | −91  | −1  | 526 | 469 | −17 | 168 | −376 |
| −297 | −125 | 0   | 411 | 396 | −8  | 125 | −427 |

Step 305: Obtain characteristic values based on the noise data;

Step 306: Perform fitting processing on noise data of a target node and the characteristic values, to obtain a fitting function in which the characteristic values are used as an independent variable and the noise data of the target node is used as a dependent variable.

Step 307: Substitute the characteristic values into the fitting function, to obtain fitting data corresponding to the characteristic values.

Step 308: Use differences between the fitting data and the noise data of the target node as noise reduced data.

Step 305 to Step 308 are approximately the same as Step 102 to Step 105 in the first embodiment. To avoid repetition, details are not described herein again.

Compared with the existing technologies, in this embodiment, sampling is performed on each touch detection node, to obtain sampling data of each touch detection node; a difference between the sampling data of each touch detection node and a datum reference value of each touch detection node is separately calculated; and the difference of each touch detection node is used as the noise data of each touch detection node. This facilitates obtaining accurate noise data, thereby improving accuracy of noise reduction. When a difference of a touch detection node is greater than the preset threshold, that is, there is a finger touching the touch detection node, the touch detection node is removed to eliminate an impact caused by the finger touch during noise reducing. Therefore, a fitting result is more accurate, thereby further improving accuracy of noise reduction.

Step division in the forgoing methods is merely for clear description. During implementation, the foregoing steps may be combined into one step, or some steps may be divided into a plurality of steps. As long as a same logical relationship is included, all of these division fall within the protection scope of this patent. In an algorithm or a procedure, an added inessential modification or an introduced inessential design that does not change a core design of the algorithm or the procedure falls within the protection scope of this patent.

Figure 4:
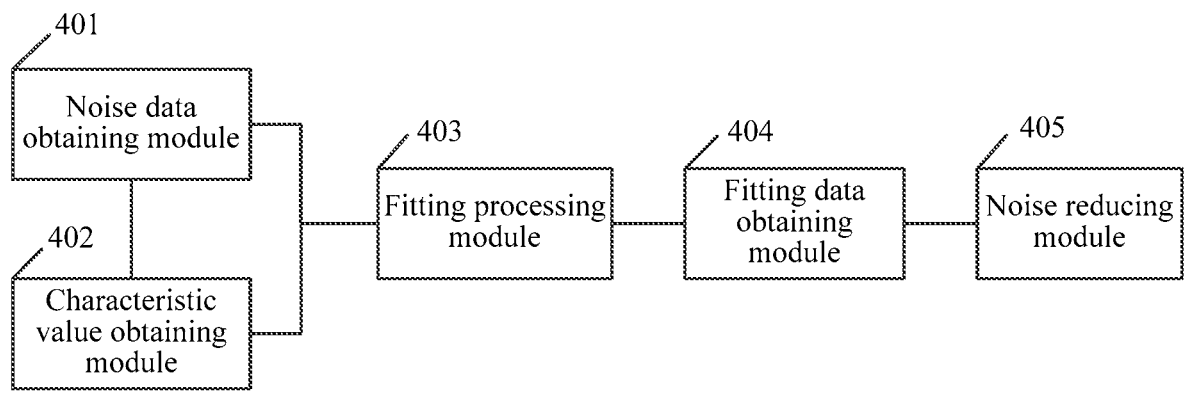
FIG. 4 is a schematic structural diagram of a touch display apparatus according to a fourth embodiment of the present disclosure.

A fourth embodiment of the present disclosure relates to a touch display apparatus. As shown in FIG. 4, the touch display apparatus includes: a noise data obtaining module 401, configured to obtain noise data of each touch detection node; a characteristic value obtaining module 402, configured to obtain characteristic values based on the noise data; a fitting processing module 403, configured to perform fitting processing on noise data of a target node and the characteristic values, to obtain a fitting function in which the characteristic values are used as an independent variable and the noise data of the target node is used as a dependent variable, where the target node is a touch detection node to be noise reduced; a fitting data obtaining module 404, configured to substitute the characteristic values into the fitting function, to obtain fitting data corresponding to the characteristic values; and a noise reducing module 405, configured to use differences between the fitting data and the noise data of the target node as noise reduced data.

The noise data obtaining module may specifically include: a sampling submodule, configured to perform sampling on each touch detection node, to obtain sampling data of each touch detection node; and a difference calculation submodule, configured to separately calculate a difference between the sampling data of each touch detection node and a datum reference value of each touch detection node, and use the difference of each touch detection node as the noise data of each touch detection node.

In an example, the sampling submodule may be further configured to perform multiple sampling on each touch detection node, to obtain multiple sampling noise data. The characteristic value obtaining module 402 may specifically include: a selecting submodule, configured to select a plurality of touch detection nodes; and a statistical processing submodule, configured to separately perform statistical processing on the noise data that is obtained by performing multiple sampling on each selected touch detection node, and obtain the characteristic values based on a statistic result.

Specifically, the selecting submodule may be specifically configured to randomly select, from several touch detection nodes disposed on the touch display apparatus, a plurality of touch detection nodes. In an example, the statistical processing submodule may be specifically configured to separately perform statistical processing, based on the noise data that is obtained by performing multiple sampling on each selected touch detection node, to obtain a maximum value, a minimum value, or an average value of the noise data of each selected touch detection node. In another example, the statistical processing submodule may be specifically configured to separately perform statistical processing based on the noise data that is obtained by performing multiple sampling on each selected touch detection node, to obtain a mode interval of the noise data of each selected touch detection node, and obtain the characteristic values based on the statistic mode interval.

In an example, the characteristic value obtaining module 402 may be configured to extract noise data of touch detection nodes having a same vertical axis coordinate and different horizontal axis coordinates, where the vertical axis coordinate of extracted touch detection nodes is different from that of the target node; and use the extracted noise data of the touch detection nodes as the characteristic values. The target node specifically refers to touch detection nodes to be noise reduced that have a same vertical axis coordinate and different horizontal axis coordinates, and the fitting function is specifically a fitting function on a horizontal axis.

In another example, the characteristic value obtaining module 402 may be configured to extract noise data of touch detection nodes having a same horizontal axis coordinate and different vertical axis coordinates, where the vertical axis coordinate of extracted touch detection nodes is different from that of the target node; and use the extracted noise data of the touch detection nodes as the characteristic values. The target node specifically refers to touch detection nodes to be noise reduced that have a same horizontal axis coordinate and different vertical axis coordinates, and the fitting function is specifically a fitting function on a vertical axis.

In actual application, the fitting processing module 403 may be further configured to: extract noise data of first-type touch detection nodes having a same vertical axis coordinate and different horizontal axis coordinates, where the vertical axis coordinate of the first-type touch detection nodes is different from that of the target node; perform fitting processing on characteristic values of the noise data of the first-type touch detection nodes and noise data of first reference target nodes, to obtain a first fitting subfunction, where the first reference target nodes are touch detection nodes located in the same row as the target node; extract noise data of second-type touch detection nodes having a same horizontal axis coordinate and different vertical axis coordinates, where the horizontal axis coordinate of the second-type touch detection nodes is different from that of the target node; perform fitting processing on characteristic values of the noise data of the second-type touch detection nodes and noise data of second reference target nodes, to obtain a second fitting subfunction, where the second reference target nodes are touch detection nodes located in the same column as the target node; and superimpose the first fitting subfunction and the second fitting subfunction, to obtain the fitting function.

It should be noted that the touch display apparatus may further include a removing submodule, configured to: remove, from the noise data of each touch detection node, noise data of the touch detection node meeting the preset condition when there is a touch detection node meeting a preset condition. The preset condition is that noise data of a touch detection node is greater than a preset threshold.

It is not difficult to find that this embodiment may be used as an apparatus embodiment corresponding to any foregoing method embodiment. This embodiment and a corresponding method embodiment may be implemented in coordination. Related technical details mentioned in the foregoing method embodiments are still effective in this embodiment. To reduce repetition, details are not described herein again.

It should be noted that all modules mentioned in this embodiment are logical modules. In actual application, a logical module may be a physical module, or a part of a physical module, or may be implemented as a combination of a plurality of physical modules. In addition, to highlight a creative part of the present disclosure, this embodiment does not introduce a module that is not closely related to solutions for solving the technical problems mentioned in the present disclosure. However, this does not indicate that there are no other modules in this embodiment.

Figure 5:
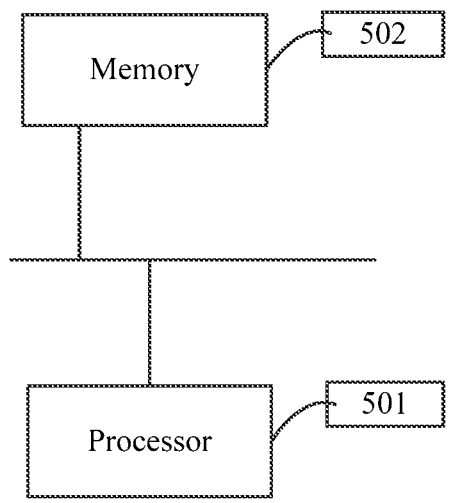
FIG. 5 is a schematic structural diagram of a touch display apparatus according to a fifth embodiment of the present disclosure.

A fifth embodiment of the present disclosure relates to a touch display apparatus. As shown in FIG. 5, the touch display apparatus includes: at least one processor 501; and a memory 502 communicably connected with the at least one processor 501. The memory 502 stores instructions executable by the at least one processor 501. The instructions, when executed by the at least one processor 501, cause the at least one processor 501 to perform the foregoing noise reduction method.

The memory 502 and the processor 501 are connected through a bus. The bus may include any quantity of buses and bridges that are interconnected. The bus connects various circuits of the one or more processors 501 and the memory 502. The bus may further connect various other circuits such as a peripheral device circuit, a voltage regulator circuit, and a power management circuit. These are well known in this field, and therefore, no further description is provided in this specification. A bus interface provides an interface between the bus and a transceiver. The transceiver may be an element, or may be a plurality of elements, for example, a plurality of receivers and transmitters. The receivers and the transmitters provide a unit configured to communicate with various other apparatuses on a transmission medium. Data processed by the processor 501 is transmitted on a wireless medium through an antenna. Furthermore, the antenna further receives data and transfers the data to the processor 501.

The processor 501 is responsible for managing the bus and general processing, and may further provide various functions, including timing, a peripheral interface, voltage regulation, power management, and other control functions. The memory 502 may be configured to store data used when the processor 501 performs an operation.

A sixth embodiment of the present disclosure relates to a computer-readable storage medium, storing a computer program. The computer program, when executed by a processor, implements the foregoing method embodiments.

A person skilled in the art may understand that all or some of the steps in the methods in the foregoing embodiments may be implemented by a program instructing relevant hardware. The program is stored in a storage medium and includes several instructions for instructing a device (which may be a single-chip microcomputer, a chip, or the like) or a processor to perform all or some steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

A person of ordinary skill in the art may understand that the foregoing embodiments are specific embodiments of implementing the present disclosure. In actual application, various changes may be made to forms and details without departing from the spirit and the scope of the present disclosure.

What is claimed is:

1. A noise reduction method, wherein the noise reduction method is applied to a touch display apparatus, several touch detection nodes are disposed on the touch display apparatus, and the method comprises:
   obtaining noise data of each touch detection node;
   obtaining characteristic values based on the noise data;

performing fitting processing on noise data of a target node and the characteristic values, to obtain a fitting function in which the characteristic values are used as an independent variable and the noise data of the target node is used as a dependent variable, wherein the target node is a touch detection node to be noise reduced;

substituting the characteristic values into the fitting function, to obtain fitting data corresponding to the characteristic values; and using differences between the fitting data and the noise data of the target node as noise reduced data.

2. The noise reduction method according to claim 1, wherein the obtaining noise data of each touch detection node comprises:

performing sampling on each touch detection node, to obtain sampling data of each touch detection node;

separately calculating a difference between the sampling data of each touch detection node and a datum reference value of each touch detection node; and using the difference of each touch detection node as the noise data of each touch detection node.

3. The noise reduction method according to claim 2, wherein before obtaining characteristic values based on the noise data, the noise reduction method further comprises:

when there is a touch detection node meeting a preset condition, removing, from the noise data of each touch detection node, noise data of the touch detection node meeting the preset condition, wherein the preset condition is that noise data of a touch detection node is greater than a preset threshold.

4. The noise reduction method according to claim 1, wherein the obtaining noise data of each touch detection node is:

performing multiple sampling on each touch detection node, to obtain multiple sampling noise data; and the obtaining characteristic values based on the noise data comprises:

selecting a plurality of touch detection nodes;

separately performing statistical processing on noise data that is obtained by performing multiple sampling on each selected touch detection node; and obtaining the characteristic values based on a statistic result.

5. The noise reduction method according to claim 4, wherein the selecting a plurality of touch detection nodes is:

randomly selecting, from the touch detection nodes disposed on the touch display apparatus, a plurality of touch detection nodes, wherein the plurality of randomly-selected touch detection nodes have a same vertical coordinate and different horizontal coordinates, or the plurality of randomly-selected touch detection nodes have a same horizontal coordinate and different vertical coordinates.

6. The noise reduction method according to claim 4, wherein the separately performing statistical processing on noise data that is obtained by multiple performing sampling on each selected touch detection node includes:

separately performing statistical processing, based on the noise data that is obtained by performing multiple sampling on each selected touch detection node, to obtain a maximum value, a minimum value, or an average value of the noise data of each selected touch detection node; and the obtaining the characteristic values based on a statistic result is:

using the maximum value, the minimum value, or the average value as the characteristic value.

7. The noise reduction method according to claim 4, wherein the separately performing statistical processing on noise data that is obtained by performing multiple sampling on each selected touch detection node includes:

separately performing statistical processing, based on the noise data that is obtained by performing multiple sampling on each selected touch detection node, to obtain a mode interval of the noise data of each selected touch detection node; and the obtaining the characteristic values based on a statistic result is:

obtaining the characteristic values based on the mode interval.

8. The noise reduction method according to claim 1, wherein the target node refers to touch detection nodes to be noise reduced that have a same vertical axis coordinate and different horizontal axis coordinates, and the fitting function is a fitting function on a horizontal axis; and the obtaining characteristic values based on the noise data comprises:

extracting noise data of touch detection nodes having a same vertical axis coordinate and different horizontal axis coordinates, wherein the vertical axis coordinate of extracted touch detection nodes is different from that of the target node; and using the extracted noise data of the touch detection nodes as the characteristic values.

9. The noise reduction method according to claim 1, wherein the target node refers to touch detection nodes to be noise reduced having a same horizontal axis coordinate and different vertical axis coordinates, and the fitting function is a fitting function on a vertical axis; and the obtaining characteristic values based on the noise data comprises:

extracting noise data of touch detection nodes having a same horizontal axis coordinate and different vertical axis coordinates, wherein the horizontal axis coordinate of extracted touch detection nodes is different from that of the target node; and using the extracted noise data of the touch detection nodes as the characteristic values.

10. The noise reduction method according to claim 1, wherein the obtaining characteristic values based on the noise data comprises:

extracting noise data of first-type touch detection nodes having a same vertical axis coordinate and different horizontal axis coordinates, wherein the vertical axis coordinate of the first-type touch detection nodes is different from that of the target node;

using the extracted noise data of the first-type touch detection nodes as first-type characteristic values;

extracting noise data of second-type touch detection nodes having a same horizontal axis coordinate and different vertical axis coordinates, wherein the horizontal axis coordinate of the second-type touch detection nodes is different from that of the target node;

using the extracted noise data of the second-type touch detection nodes as second-type characteristic values; and the performing fitting processing on noise data of a target node and the characteristic values, to obtain a fitting function in which the characteristic values are used as an independent variable and the noise data of the target node is used as a dependent variable comprises:

performing fitting processing on the first-type characteristic values and noise data of first reference target nodes, to obtain a first fitting subfunction, wherein the first reference target nodes are touch detection nodes located in a same row as the target node;

performing fitting processing on the second-type characteristic values and noise data of second reference target nodes, to obtain a second fitting subfunction, wherein the second reference target nodes are touch detection nodes located in a same column as the target node; and superimposing the first fitting subfunction and the second fitting subfunction, to obtain the fitting function.

11. The noise reduction method according to claim 1, wherein a touch control layer of the touch display apparatus is integrated in a display panel.

12. The noise reduction method according to claim 2, wherein a touch control layer of the touch display apparatus is integrated in a display panel.

13. The noise reduction method according to claim 3, wherein a touch control layer of the touch display apparatus is integrated in a display panel.

14. The noise reduction method according to claim 4, wherein a touch control layer of the touch display apparatus is integrated in a display panel.

15. The noise reduction method according to claim 5, wherein a touch control layer of the touch display apparatus is integrated in a display panel.

16. The noise reduction method according to claim 6, wherein a touch control layer of the touch display apparatus is integrated in a display panel.

17. The noise reduction method according to claim 7, wherein a touch control layer of the touch display apparatus is integrated in a display panel.

18. A touch display apparatus, comprising:
at least one processor; and
a memory communicably connected with the at least one processor;
wherein the memory stores instructions executable by the at least one processor, and the instructions, when executed by the at least one processor, cause the at least one processor to perform a noise reduction method,
wherein the noise reduction method is applied to a touch display apparatus, several touch detection nodes are disposed on the touch display apparatus, and the noise reduction method comprises:
obtaining noise data of each touch detection node;
obtaining characteristic value based on the noise data;
performing fitting processing on noise data of a target node and the characteristic value, to obtain a fitting function in which the characteristic value are used as an independent variable and the noise data of the target node is used as a dependent variable, wherein the target node is a touch detection node to be noise reduced;
substituting the characteristic value into the fitting function, to obtain fitting data corresponding to the characteristic value; and
using differences between the fitting data and the noise data of the target node as noise reduced data.

19. The touch display apparatus according to claim 18, wherein the obtaining noise data of each touch detection node comprises:
performing sampling on each touch detection node, to obtain sampling data of each touch detection node;
separately calculating a difference between the sampling data of each touch detection node and a datum reference value of each touch detection node; and
using the difference of each touch detection node as the noise data of each touch detection node.

20. A computer-readable storage medium, storing a computer program, wherein the computer program, when executed by a processor, implements a noise reduction method, wherein the noise reduction method is applied to a touch display apparatus, several touch detection nodes are disposed on the touch display apparatus, and the noise reduction method comprises:
obtaining noise data of each touch detection node;
obtaining characteristic value based on the noise data;
performing fitting processing on noise data of a target node and the characteristic value, to obtain a fitting function in which the characteristic value are used as an independent variable and the noise data of the target node is used as a dependent variable, wherein the target node is a touch detection node to be noise reduced;
substituting the characteristic value into the fitting function, to obtain fitting data corresponding to the characteristic value; and
using differences between the fitting data and the noise data of the target node as noise reduced data.

* * * * *